United States Patent

[11] 3,618,667

| [72] | Inventor | Earl S. Snavely, Jr. |
| | | Arlington, Tex. |
| [21] | Appl. No. | 17,279 |
| [22] | Filed | Mar. 6, 1970 |
| [45] | Patented | Nov. 9, 1971 |
| [73] | Assignee | Mobil Oil Corporation |

[54] REMOVAL OF DISSOLVED OXYGEN FROM WATER
13 Claims, 9 Drawing Figs.

[52] U.S. Cl. .................................................. 166/310,
166/275, 210/63, 252/8.55 E
[51] Int. Cl. .................................................. C02b 1/18,
E21b 43/22
[50] Field of Search ........................................... 166/310,
279, 305, 265, 267, 300, 275; 252/8.55 E; 23/225
R; 210/63, 59, 50

[56] References Cited
UNITED STATES PATENTS

| 1,829,705 | 10/1931 | Walker | 166/310 UX |
| 2,357,559 | 9/1944 | Smith | 166/310 |
| 2,510,771 | 6/1950 | Bond et al | 166/310 X |
| 2,756,211 | 7/1956 | Jones | 252/8.55 E |
| 2,897,150 | 7/1959 | Bencowitz | 210/63 |
| 3,186,942 | 6/1965 | Benger | 210/63 |
| 3,388,057 | 6/1968 | Callahan | 210/63 X |
| 3,460,913 | 8/1969 | Hoekstra | 210/63 X |

FOREIGN PATENTS

| 558,684 | 6/1958 | Canada | |

OTHER REFERENCES

Sheppard, " Pipe Line Corrosion By Sour Crudes," World Oil, Pipeline Section, June, 1949, pp. 193, 194, 198 and 202.

Primary Examiner—Stephen J. Novosad
Attorneys—William J. Scherback, Frederick E. Dumoulin, William D. Jackson, Henry L. Ehrlich, Andrew L. Gaboriault and Sidney A. Johnson ABSTRACT: This specification discloses a method of treating water which contains hydrogen sulfide and oxygen dissolved therein to retard the corrosion of metal in contact with the water. A transition metal is added to the water which transition metal catalyzes the reaction between hydrogen sulfide and oxygen, thereby removing the oxygen from the water.

EARL S. SNAVELY, JR.
INVENTOR

BY
ATTORNEY

EARL S. SNAVELY, JR.
INVENTOR

EARL S. SNAVELY, JR.
INVENTOR

REMOVAL OF DISSOLVED OXYGEN FROM WATER

BACKGROUND OF THE INVENTION

This invention relates to the treatment of water containing dissolved oxygen to remove the dissolved oxygen and thereby prevent or retard the corrosion of metal contacted by the water.

Corrosion of pipelines and other parts of water distribution systems by oxygen dissolved in water has long been a problem recognized in the art. Avoiding corrosion of metals contacted by such waters has been attempted, for example, by laying down a deposit of calcium carbonate over the metals to protect the metals from corrosion. U.S. Pat. No. 2,337,856 to O. N. Rice et al. describes a method of treating water which does not contain sufficient Ca and $CO_3$ ions to form a protective coating of calcium carbonate on the metal. Rice et al.'s method comprises adding to the water a very small amount of sodium metaphosphate or other alkali metal metaphosphate. The amount of sodium metaphosphate added is such as will cause a formation of a film of $Ca(PO_3)_2$ or some calcium metaphosphate complex on the metal to be protected.

Other techniques of protecting metal from corrosion due to oxygen in water involve the removal of oxygen from the water. Such techniques are discussed by R. F. Weeter in a paper presented at an AIChE Permian Basin Technical Symposium presented at Odessa, Texas, Mar. 25-26, 1968. One method discussed by Weeter of scavenging oxygen from water involves the use of sodium sulfite and a catalyst of divalent metallic ion (usually cobalt). The reaction is $Na_2SO_3 + \frac{1}{2}O_2 \rightarrow Na_2SO_4$. This reaction requires eight pounds of sodium sulfite for each pound of oxygen removed plus an additional five to ten parts per million to drive the reaction to completion. Another method discussed by Weeter of scavenging oxygen from water concerns injecting sulfur dioxide into the water. The reaction is $SO_2 + H_2O + \frac{1}{2}O_2 \rightarrow H_2SO_4$. This reaction requires four pounds of sulfur dioxide for each pound of oxygen removed and approximately four parts per million additional to drive the reaction to completion.

Weeter, in discussing the removal of hydrogen sulfide, states that no economical chemical treatment has been established for the removal of hydrogen sulfide except for small concentration, in which case chlorine gas, sodium or calcium hypochlorite or potassium permanganate are used as oxidizing agents. The reactions are as follows:

$Cl_2 + H_2S = 2HCl + S$
$NaOCl + H_2S = NaCl + S + H_2O$
$Ca(OCl)_2 + 2H_2S = CaCl_2 + 2S + 2H_2O$
$2KMnO_4 bz 3H_2S = 2MnO_2 + 2H_2O + 3S + 2KOH$

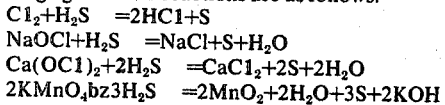

These reactions will not go to completion unless a considerable excess of the oxidizing agent is present. This results in both sulfide and an oxidizing agent remaining in the water and corrosion is enhanced rather than mitigated.

Weeter then states that:

"Since chemical treatment has not proved feasible, mechanical scrubbing has been attempted by several means with some success and much difficulty."

"This is successful for small quantities of hydrogen sulfide, but, when tried with larger concentrations, removal of hydrogen sulfide and carbon dioxide raises the pH, which in turn, changes hydrogen sulfide to soluble sulfides. These can not be removed by aeration and the efficiency of stripping drops to near zero. In any case, aeration leaves residual oxygen in the system, and a corrosive environment remains. Moreover, the treated water may be more corrosive than the feed water because the inefficiency of the process may leave considerable amounts of both sulfide and oxygen in solution after partial removal of sulfide by aeration."

SUMMARY OF THE INVENTION

This invention concerns treating water which contains hydrogen sulfide and oxygen dissolved therein to retard the corrosion of metal in contact with the water. A transition metal in an amount of at least 0.0025 part per million is added to the water. The transition metal catalyzes the reaction between the hydrogen sulfide and the oxygen and thereby removes the oxygen from the water. Preferred transition metals are cobalt and nickel.

In accordance with a preferred embodiment, a sufficient amount of hydrogen sulfide is added to the water to provide at least a stoichiometric amount of hydrogen sulfide and a transition metal is added to catalyze the reaction between the hydrogen sulfide and oxygen.

DESCRIPTION OF PREFERRED EMBODIMENTS

I have discovered a method of treating waters containing hydrogen sulfide and oxygen dissolved therein to remove the dissolved oxygen and thereby retard or prevent corrosion of metal which is contacted by the waters. My method is based upon the discovery that hydrogen sulfide and oxygen dissolved in waters can be forced to react rapidly by the addition thereto of a transition metal which serves as a catalyst. The end products of the reaction are free elemental sulfur and water. Dissolved oxygen is thus removed from the waters thereby preventing or greatly retarding corrosion of metals contacted by the water.

Reference is now made to the figures for a more detailed description of my invention.

Figure 6:
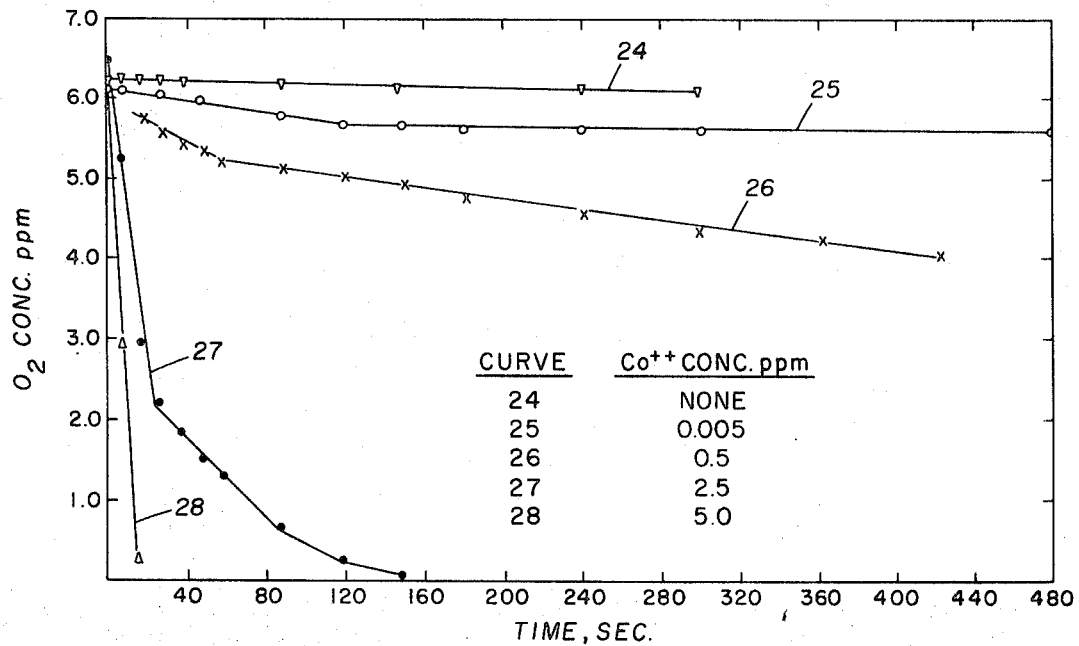
FIG. 6 is a graph showing the reaction at 25° C. and pH of 6.5 of dissolved oxygen with hydrogen sulfide in the presence of $Co^{++}$ ion of various concentrations.
Figure 7:
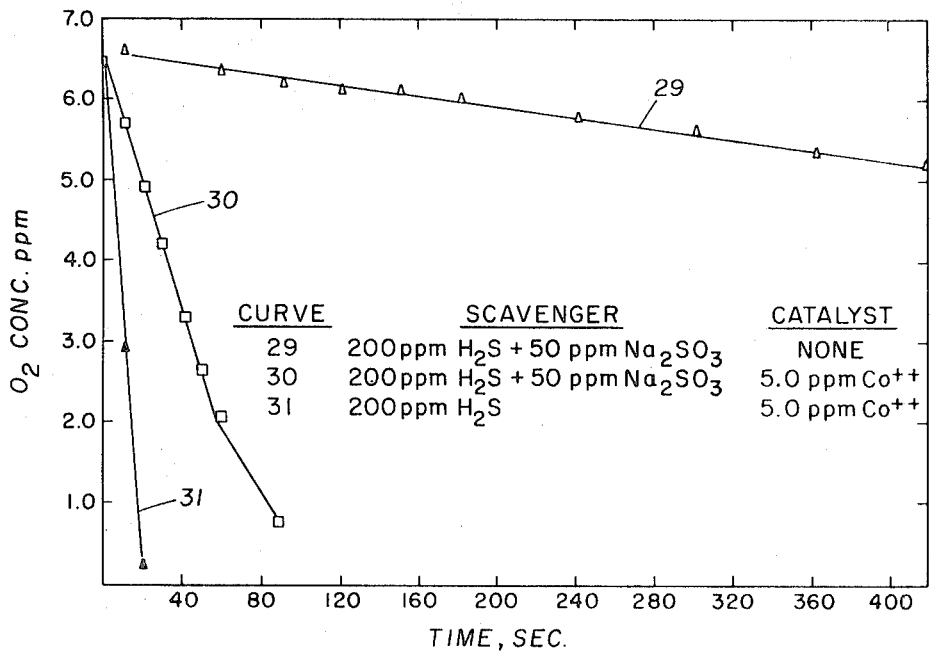
FIG. 7 is a graph of the reaction at 25° C. (77° F.) in a 3.5 percent sodium chloride solution at pH of 6.2 of dissolved oxygen with hydrogen sulfide and sodium sulfite.
Figure 8:
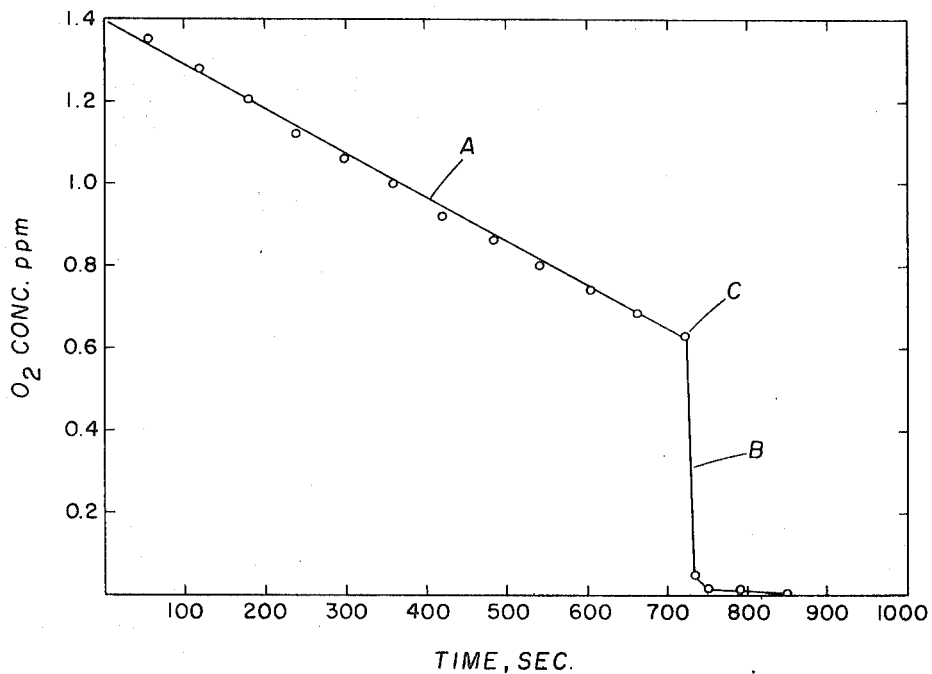
FIG. 8 is a graph of the rate of reaction at 75° F. of dissolved oxygen with $H_2S$ in Capitan Reef water.

FIGS. 1 through 8 are graphs of results obtained in running experiments wherein the reaction of oxygen ($O_2$) with hydrogen sulfide ($H_2S$) was measured. In the experiments for FIGS. 1 through 7 the oxygen and hydrogen sulfide were dissolved in 3.5 percent sodium chloride (NaCl) solutions which were considered as standard brine solutions. In FIG. 8 the oxygen and hydrogen sulfide were dissolved in a natural brine. The abscissa of FIGS. 1 through 8 is time in seconds (FIGS. 1-4 plotted on log scale) and the ordinate is $O_2$ concentration in parts per million (p.p.m.). The reactions were carried out at 25° C. (77° F.), the initial hydrogen sulfide concentration was 200 p.p.m., and the initial $O_2$ concentration varied between 6 and 8 p.p.m. Zero time is the time at which the last reactant was added to the solution. Generally $H_2S$ was the last reactant added.

Figure 1:
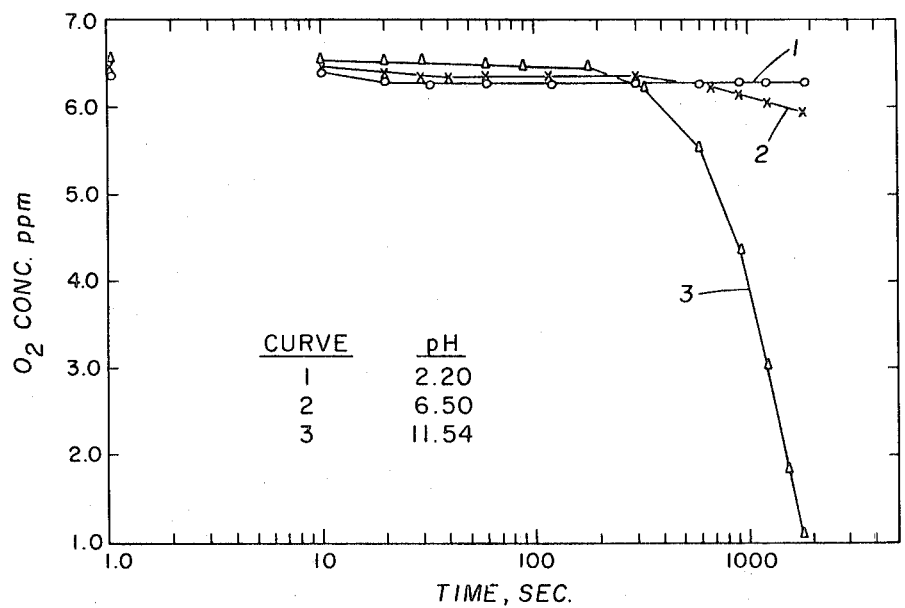
FIG. 1 is a graph showing the reaction of oxygen with hydrogen sulfide in a 3.5 percent sodium chloride solution.

There is shown in FIG. 1 the variation in $O_2$ concentration with time, or, in other words, the reaction rate of $O_2$ with $H_2S$ at three different pH values: 2.20, 6.50, and 11.54. Curve 1 shows the reaction rate of oxygen with hydrogen sulfide at a pH of 2.20; curve 2 at a pH of 6.50, and curve 3 at a pH of 11.54 Curves 1 and 2 show that the dissolved oxygen and hydrogen sulfide react extremely slowly at pH's of 2.20 and 6.50. Curve 3 indicates that at pH 11.54 the reaction is somewhat autocatalytic and goes nearly to completion in thirty minutes.

Experiments were run to determine the reaction of dissolved oxygen with hydrogen sulfide in the presence of catalysts and to evaluate catalysts for the reaction of $O_2$ with $H_2S$. The compounds used in preparing catalyst solutions were $FeCl_2 \cdot 4H_2O$, $CoCl_2 \cdot 6H_2O$, $MnCl_2 \cdot 4H_2O$, $NiCl_2 \cdot 6H_2O$, and $CuCl_2 \cdot 2H_2O$. All the solutions were prepared to contain 0.206 gram of metal ion per 100 milliliters. The volume of the reaction cell used in carrying out the experiments was about 410 milliliters. Thus, the injection of 1.0 cc. of catalyst solution into the reaction cell results in injecting 0.00206 gram of metal ion into the cell. This expressed as percent of metal ion in the reaction cell, considering the density of the solution in the cell to be 1, is 0.00206/410 or 0.0005 percent and expressed as parts per million is 5 p.p.m.

Figure 2:
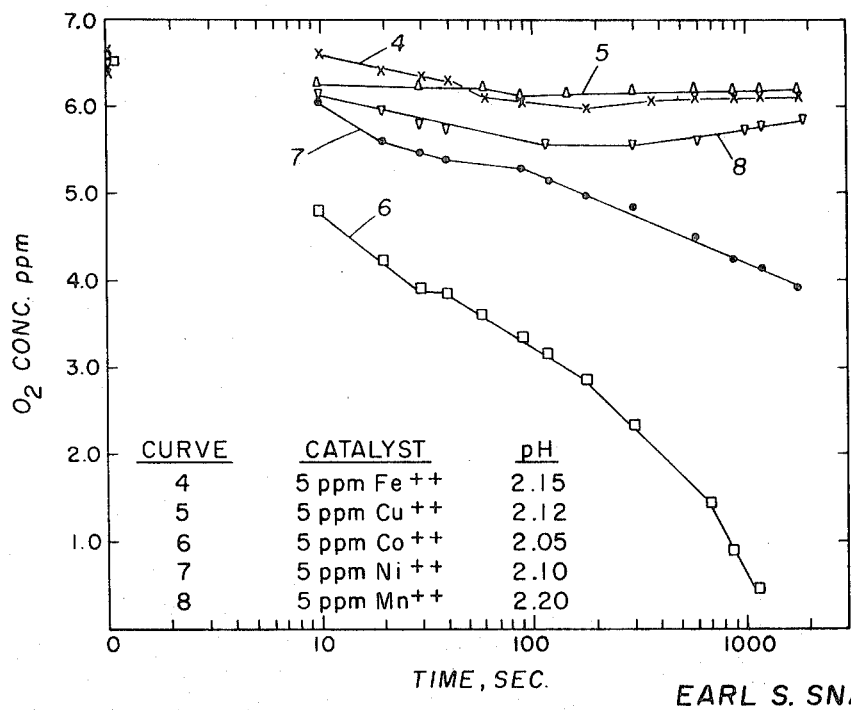
FIG. 2 is a graph showing the reaction at 25° C. of dissolved oxygen with hydrogen sulfide in a 3.5 percent sodium chloride solution in the presence of various metal ions (pH about 2).
Figure 3:
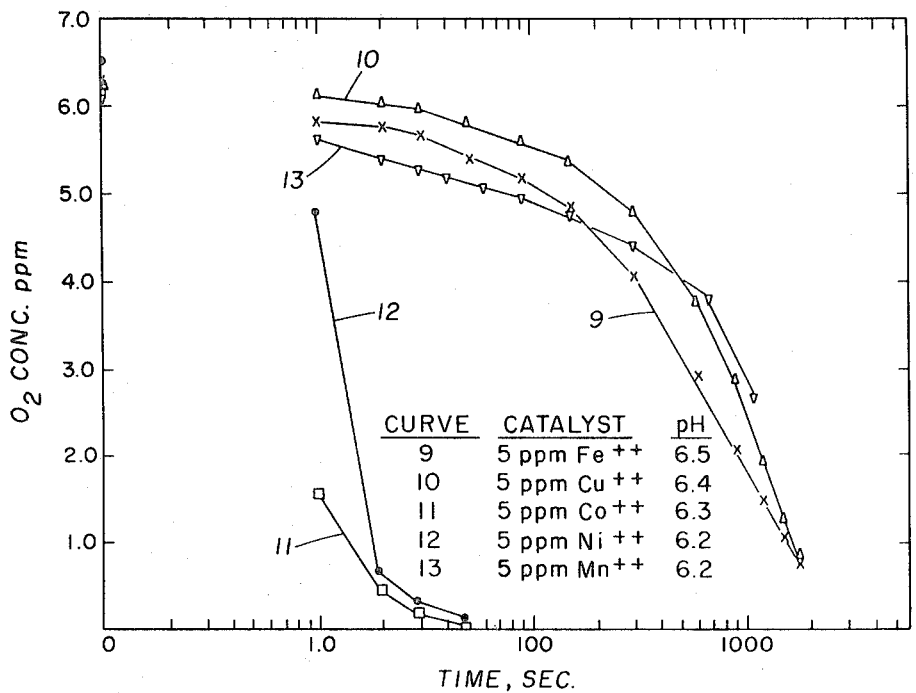
FIG. 3 is a graph of the reaction at 25° C. of dissolved oxygen with hydrogen sulfide in a 3.5 percent sodium chloride solution in the presence of various metal ions (pH about 6).
Figure 4:
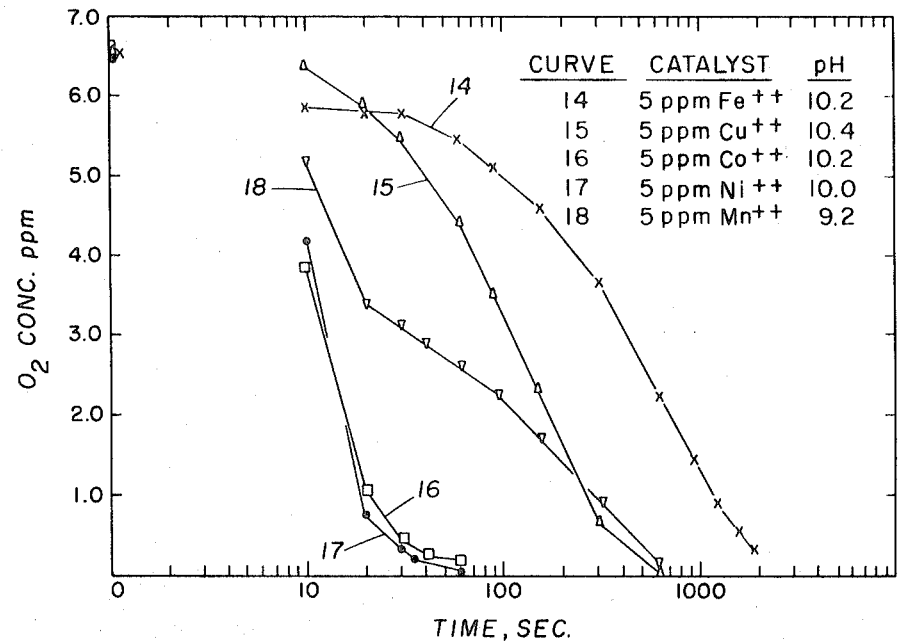
FIG. 4 is a graph showing the reaction at 25° C. of dissolved oxygen with hydrogen sulfide in a 3.5 percent sodium chloride solution in the presence of various metal ions (pH about 10).

Results of the catalyst experiments at pH's of about 2, 6, and 10 are shown in FIGS. 2, 3, and 4, respectively. As was the case in FIG. 1, these reactions were carried out at 25° C. with 220 p.p.m. of $H_2S$ dissolved in a 3.5 percent sodium chloride solution. These figures show the reaction of dissolved oxygen with hydrogen sulfide in the presence of five transition metal catalysts. The transition metal catalysts tested were iron, copper, cobalt, nickel, and manganese. These were considered to be characteristic of all transition metal catalysts. In FIG. 2, curve 4 shows reaction of oxygen with hydrogen sulfide in the presence of 5 p.p.m. $Fe^{++}$ at a pH of 2.15; curve 5, 5 p.p.m. $Cu^{++}$ at pH 2.12; curve 6, 5 p.p.m. $Co^{++}$ at pH 2.05; curve 7, 5 p.p.m. $Ni^{++}$ at pH 2.10; and curve 8, 5 p.p.m. $Mn^{++}$ at pH 2.20. In FIG. 3, curve 9 shows the reaction of oxygen with hydrogen sulfide in the presence of 5 p.p.m. $Fe^{++}$ at pH 6.5; curve 10, 5 p.p.m. $Cu^{++}$ at pH 6.4; curve 11, 5 p.p.m. $Co^{++}$ at pH 6.3; curve 12, 5 p.p.m. $Ni^{++}$ at pH 6.2; and curve 13, 5 p.p.m. $Mn^{+++}$ at pH 6.2. In FIG. 4, curve 14 shows the reaction of oxygen with hydrogen sulfide in the presence of 5 p.p.m. $Fe^{++}$ at pH 10.2; curve 15, 5 p.p.m. $Cu^{++}$ at pH 10.4; curve 16, 5 p.p.m. $Co^{++}$ at pH 10.2; curve 17, 5 p.p.m. $Ni^{++}$ at pH 10.0, and curve 18, 5 p.p.m. $Mn^{++}$ at pH 9.2. As was observed in the absence of catalysis as shown in FIG. 1, the reaction rate of $O_2$ with $H_2S$ increases with increasing values of pH, (compare curves 4–8, FIG. 2, with curves 9–13, FIG. 3, and with curves 14–18, FIG. 4). At pH of about 2, only $Co^{++}$ and $Ni^{++}$ (curves 6 and 7, FIG. 2) exhibit catalytic activity. At higher pH's all the metal ions tested exhibit some catalytic activity but $Ni^{++}$ and $Co^{++}$ are shown to be the most active. Therefore, for best catalytic activity the solution being treated should have a pH of 6 or greater.

Figure 5:
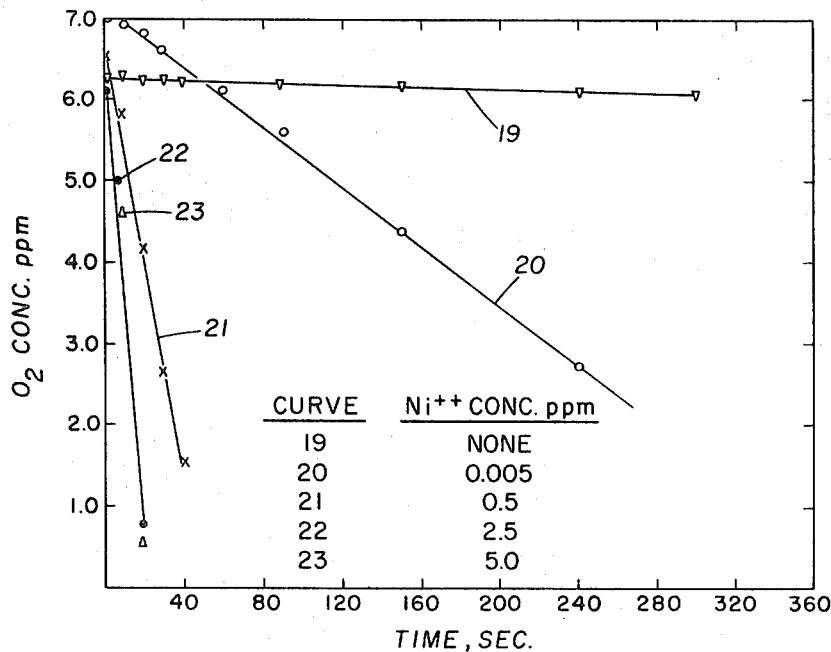
FIG. 5 is a graph showing the reaction at 25° C. and pH of 6.8 of dissolved oxygen with hydrogen sulfide in a 3.5 percent sodium chloride solution in the presence of $Ni^{++}$ ion of various concentrations.

The above experiments were repeated for $Ni^{++}$ and $Co^{++}$ using several concentrations to determine the total metal ion concentration needed to catalyze the reaction between $H_2S$ and $O_2$. These experiments were carried out at 25° C. with 200 p.p.m. $H_2S$ in a 3.5 percent NaCl solution at a pH of about 6.5. The results of these experiments are shown in FIGS. 5 and 6. Curve 19 shows the reaction between oxygen and hydrogen sulfide in the absence of any transition metal catalyst. Curve 20 shows reaction of oxygen with hydrogen sulfide in the presence of 0.0005 p.p.m. $Ni^{++}$; curve 21, in the presence of 0.5 p.p.m. $Ni^{++}$; curve 22, in the presence of 2.5 p.p.m. $Ni^{++}$; and curve 23, in the presence of 5.0 p.p.m. $Ni^{++}$. Curve 22 and curve 23 are so nearly the same that they are represented by a single line. Curve 24 of FIG. 6 shows the reaction of dissolved oxygen with hydrogen sulfide in the absence of a transition metal ion catalyst. Curve 25 shows the reaction of dissolved oxygen with hydrogen sulfide in the presence of 0.005 p.p.m. $Co^{++}$; curve 26, in the presence of 0.5 p.p.m. $Co^{++}$; curve 27, in the presence of 2.5 p.p.m. $Co^{++}$; and curve 28, in the presence of 5.0 p.p.m. $Co^{++}$. Comparison of the curves of FIGS. 5 and 6 shows that nickel ion far exceeds cobalt ion in catalytic activity at a pH of about 6. Curve 20 shows that $Ni^{++}$ has appreciable catalytic activity at a concentration of 0.005 p.p.m. while $Co^{++}$ as shown by curve 26 is only slightly active at a concentration of 0.5 p.p.m. In a higher pH solution even less transition metal ions are needed to catalyze the reaction between $O_2$ and $H_2S$. Under certain conditions as little as 0.0025 p.p.m. of transition metal ion, in particular $Ni^{++}$, is needed to catalyze the reaction.

The transition metal may be added in metallic form or in ionic form. For example, a transition metal screen may be used to contact the solution and catalyze the reaction. However, adding the transition metal in ionic form, e.g. as a solution of a transition metal salt, is preferred. The transition metal in ionic form becomes more uniformly dispersed throughout the solution and thus better catalyzes the reaction between $O_2$ and $H_2S$.

In accordance with a preferred embodiment of my invention, a transition metal in an amount of at least 0.0025 p.p.m. is introduced into the water which is free of added sulfite ions and which water contains hydrogen sulfide and oxygen dissolved therein. The transition metal catalyzes the reaction between $H_2S$ and $O_2$ thereby chemically removing the $O_2$ from the water. Sulfite ions are detrimental to my process. However, low concentrations of sulfite ions as might be found naturally in waters can be tolerated without seriously affecting the efficiency of my method. By sulfite ions is meant ions which are represented as $SO_3^=$. Thus, both sulfur dioxide ($SO_2$) and sodium sulfite ($Na_2SO_3$) when added to water ionize and yield sulfite ions as illustrated by equations (1) and (2) below:

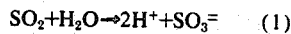
$$SO_2 + H_2O \rightarrow 2H^+ + SO_3^= \quad (1)$$

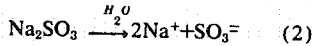
$$Na_2SO_3 \xrightarrow{H_2O} 2Na^+ + SO_3^= \quad (2)$$

There are a number of reasons why the presence of sulfite ions is detrimental to my process. One such reason is that the addition of $SO_2$ acidifies the water by reaction (1) thus slowing the rate of reaction between $H_2S$ and $O_2$ as shown in FIGS. 1–4. This increased acidity is permanent because even if the $H_2SO_3$ reacts with $O_2$ a strong acid remains:

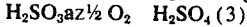
$$H_2SO_3 \, az \, \tfrac{1}{2} O_2 \; H_2SO_4 \quad (3)$$

Another possible detrimental effect of the presence of $Na_2SO_3$ or $SO_2$ in sour water is the possibility of the $Na_2SO_3$ or $SO_2$ reacting with $H_2S$ thereby reducing the $H_2S$ concentration rather than leaving it available to react with $O_2$.

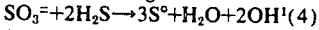
$$SO_3^= + 2H_2S \rightarrow 3S° + H_2O + 2OH^1 \quad (4)$$

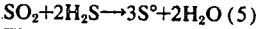
$$SO_2 + 2H_2S \rightarrow 3S° + 2H_2O \quad (5)$$

Therefore in carrying out my invention it is highly desirable that the sour water containing dissolved oxygen be free of sulfite ions. Upon the addition of a transition metal catalyst the $H_2S$ and $O_2$ react and remove the $O_2$ from the water. The equation for the reaction follows:

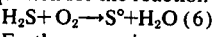
$$H_2S + O_2 \rightarrow S° + H_2O \quad (6)$$

Further experiments were run which clearly show the improvement in scavenging oxygen from sour waters in accordance with the preferred embodiment of my invention of adding to the sour waters containing dissolved $O_2$ a transition metal while maintaining the sour waters free of added sulfite ions. These results obtained at 25° C. in a 3.5 percent NaCl solution at a pH of 6.2 are shown in FIG. 7. The rate of removal of dissolved oxygen from the water is slow where 200 p.p.m. $H_2S$ and 50 p.p.m. $Na_2SO_3$ are added in the absence of a catalyst as shown by curve 29. Curve 30 shows a much faster rate of removal of dissolved oxygen when 200 p.p.m. $H_2S$ and 50 p.p.m. $Na_2SO_3$ are added to the water along with 5.0 p.p.m. of $Co^{++}$. Curve 31 shows a still faster rate of removal of oxygen from the water when 200 p.p.m. $H_2S$ is added as a scavenger with 5.0 p.p.m. $Co^{++}$ added as a catalyst in the absence of added $Na_2SO_3$. Thus, FIG. 7 clearly shows that dissolved oxygen is best removed from sour waters by the addition of a catalyst in the absence of added $Na_2SO_3$ or sulfite ions.

Further experiments were run to determine the rate of reaction of dissolved oxygen with $H_2S$ in natural brines. These results were run at 75° F. and are plotted in FIG. 8. Curve A shows the natural reaction rate of $O_2+H_2S$ upon the introduction of $H_2S$ at zero time. Upon the addition of 1.3 p.p.m. of $Co^{++}$, point C, the reaction rate of $O_2$ increases tremendously as shown by curve B.

In all of the above experiments the waters contained at least a stoichiometric amount of $H_2S$ or a sufficient amount of $H_2S$ was added to supply the stoichiometric amount. If water containing dissolved oxygen has less than a stoichiometric amount of $H_2S$ dissolved therein and such waters are to be treated in accordance with my invention, then $H_2S$ should be added in a sufficient amount to bring the total dissolved $H_2S$ in the water to at least the stoichiometric amount. Of course an excess of $H_2S$ can be dissolved in the water, in which case the dissolved oxygen will react upon the addition of a catalyst to the water with a stoichiometric amount of $H_2S$ leaving the excess $H_2S$ in the water. The resulting water containing dissolved $H_2S$ in the absence of dissolved oxygen is normally not particularly corrosive to metal.

Figure 9:
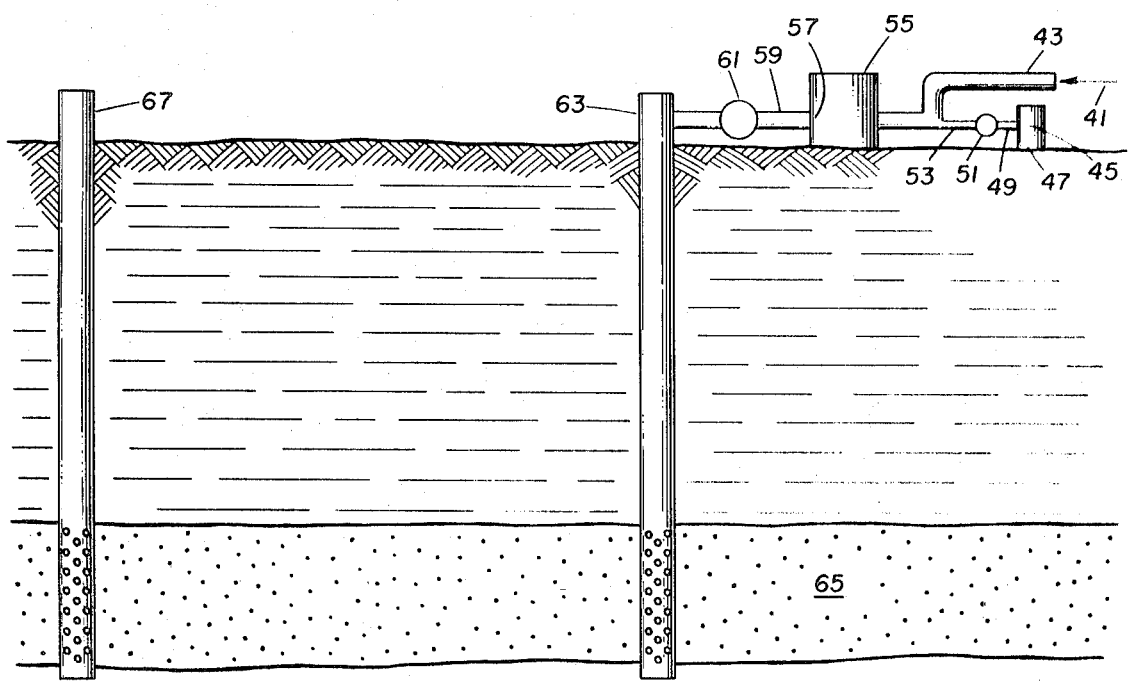
FIG. 9 is a schematic diagram of a waterflood process using sour water which is free of dissolved oxygen.

Particular applications of my invention concern removing dissolved oxygen from sour waters which are to be injected through wells into earth formations. For example, sour waters containing dissolved oxygen may be available for injection into the earth in such procedures as waterfloods or Frasch sulfur-mining processes. Upon removal of the dissolved oxygen therefrom these waters can be used in such applications with minimal corrosive damages. A particular application of my invention to a sour waterflood is illustrated in FIG. 9. There sour water 41 containing dissolved oxygen is shown flowing through conduit 43. A transition metal catalyst 45 is contained in storage tank 47. Storage tank 47 is connected by conduit 49 to pump 51 which in turn is connected through conduit 53 to conduit 43. The transition metal catalyst 45 is injected from storage tank 47 via conduit 49 and pump 51 and conduit 53 into the sour water 41 flowing in conduit 43. The water then flows into a reaction tank 55 where it is maintained a sufficient length of time for the dissolved $H_2S$ and $O_2$ to react, thereby removing the $O_2$ from the water. The oxygen-free water 57 is pumped from reaction tank 55 through conduit 59 and injection pump 61 into well 63 and thence into formation 65. Oxygen-free water 57 is thus injected via injection well 63 into formation 65 to drive hydrocarbons toward production well 67 where they are recovered. Thus, a corrosive sour water is converted into a noncorrosive water by removing the dissolved oxygen therefrom.

The system of FIG. 9 illustrates one way of maintaining the water at the surface for a sufficient time to permit the $O_2$ to be removed from the water prior to its introduction into wells in the earth. Corrosion of metal in the wells is thus retarded or prevented thereby eliminating expensive remedial work. Other systems may be utilized for maintaining the water at the surface for the sufficient time required for the $H_2S$ and $O_2$ to combine thereby removing the $O_2$ from the water.

What is claimed is:

1. A method of treating water which contains hydrogen sulfide and oxygen dissolved therein to retard the corrosion of metal in contact with said water comprising adding to said water a transition metal in an amount of at least 0.0025 part per million whereby said transition metal catalyzes the reaction between said hydrogen sulfide and said oxygen to remove dissolved oxygen from said water.

2. The method of claim 1 wherein said transition metal is added in ionic form.

3. The method of claim 1 wherein said transition metal is selected from the group consisting of nickel and cobalt.

4. The method of claim 3 wherein said transition metal is nickel.

5. The method of claim 3 wherein said transition metal is added in an amount of 0.0025 p.p.m. to 5.0 p.p.m.

6. A method of treating water which contains oxygen dissolved therein to retard the corrosion of metal in contact with said water, comprising:
   a. adding sufficient hydrogen sulfide to said water to provide at least a stoichiometric amount of hydrogen sulfide; and
   b. adding a transition metal to said water in an amount of at least 0.0025 p.p.m. whereby the reaction between said hydrogen sulfide and said oxygen is catalyzed thereby removing said dissolved oxygen from said water.

7. The method of claim 6 wherein said transition metal is selected from the group consisting of nickel and cobalt.

8. A method of treating water which is free of added sulfite ions, said water containing hydrogen sulfide and oxygen dissolved therein, to retard the corrosion of metal in contact with said water, comprising adding to said water a transition metal in an amount of at least 0.0025 p.p.m. whereby said transition metal catalyzes the reaction between said hydrogen sulfide and said oxygen thereby removing said oxygen from said water.

9. The method of claim 8 wherein said transition metal is selected from the group consisting of nickel and cobalt.

10. The method of claim 9 wherein said transition metal is nickel.

11. A method of treating water to be injected through metal conduits into a well provided in the earth, said water containing hydrogen sulfide and oxygen dissolved therein, comprising:
   a. adding to said water at the surface a transition metal in an amount of at least 0.0025 p.p.m.
   b. maintaining said water at the surface for a sufficient time for said dissolved hydrogen sulfide and oxygen catalyzed by said transition metal to react thereby removing said dissolved oxygen from said water; and
   c. injecting said water into said well and thereby retarding the corrosion of metal in contact with said water.

12. The method of claim 11 wherein said transition metal is selected from nickel and cobalt.

13. The method of claim 12 wherein said transition metal is nickel.

* * * * *

UNITED STATES PATENT OFFICE
CERTIFICATE OF CORRECTION

Patent No. 3,618,667  Dated November 9, 1971

Inventor(s) Earl S. Snavely, Jr.

It is certified that error appears in the above-identified patent and that said Letters Patent are hereby corrected as shown below:

Column 1, line 43, "concentration" should read --concentrations--;
line 49, that portion of the equation reading $$2KMnO_4 bz 3H_2S \quad \text{should read} \quad 2KMnO_4 + 3H_2S$$

Column 3, line 39, "$Mn^{+++}$" should read --$Mn^{++}$--
line 63, "0.0005" should read --0.005--.

Column 4, line 41, Equation (3) should read:

$$H_2SO_3 + 1/2\ O_2 \rightarrow H_2SO_4$$

line 46, Equation (4) should read:

$$SO_3^= + 2H_2S \rightarrow 3S° + H_2O + 2\ OH^-$$

line 54, Equation (6) should read:

$$H_2S + 1/2\ O_2 \rightarrow S° + H_2O$$

Signed and sealed this 2nd day of May 1972.

(SEAL)
Attest:

EDWARD M. FLETCHER, JR.
Attesting Officer

ROBERT GOTTSCHALK
Commissioner of Patents